June 27, 1944.                M. L. ANDERSON                2,352,359
                             FAUCET SPRAY NOZZLE
                             Filed March 19, 1943
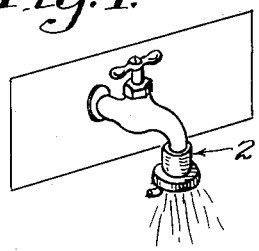
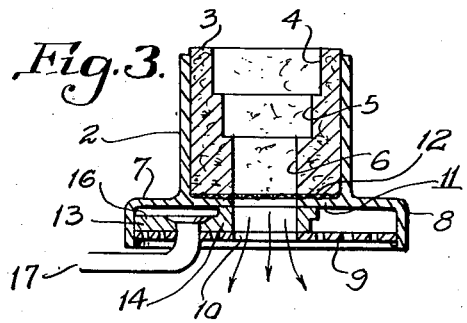
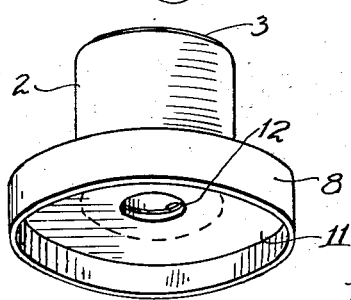
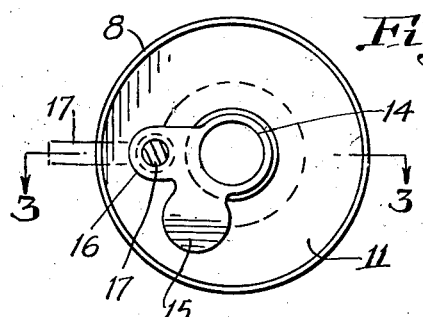
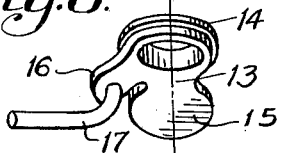
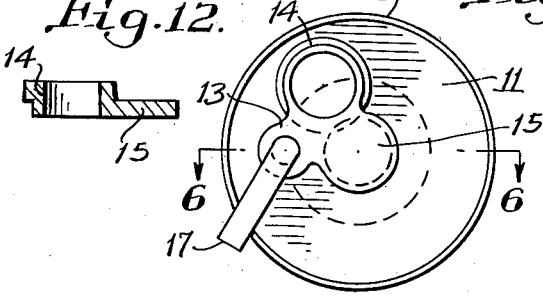
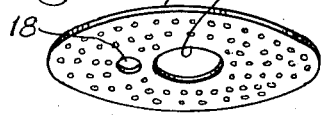
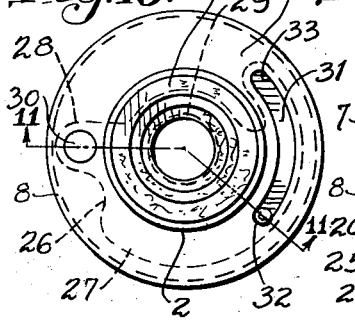
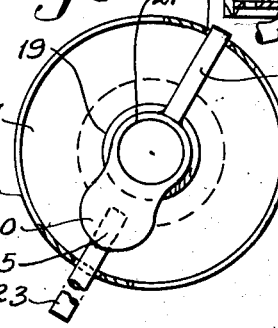
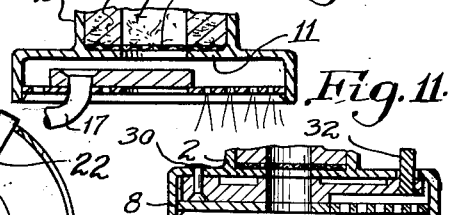
INVENTOR.
MAX L. ANDERSON
BY W. E. Williams
ATTORNEY.

Patented June 27, 1944

2,352,359

UNITED STATES PATENT OFFICE 2,352,359

FAUCET SPRAY NOZZLE

Max Leona Anderson, Los Angeles, Calif.

Application March 19, 1943, Serial No. 479,813

6 Claims. (Cl. 299—145)

My invention relates to faucet spray nozzles which are adapted to be applied to regular faucet spigots found in association with kitchen sinks and wash basins and other analagous uses wherein a single faucet stream discharge is converted into a spray as and when a spray is desired in place of an ordinary faucet stream.

This invention relates to what may be termed as an attachment to the common faucets already in use and may be applied as and when desired and removed likewise, thus being a portable device which may be attached when a spray is needed and removed when the regular faucet stream is desired.

However, the invention is provided with mechanisms whereby the water from the faucet discharge may be directed to pass through the spray screen only while the single stream of the faucet is shut off by a gate valve. This gate valve may be opened and then there is means provided which allows the regular faucet stream to pass while the perforated screen is shut off, and the entire attachment still remains on the faucet.

What is above described is not broadly new save only as to the meritorious details of my invention as herein shown and described.

I prefer to make my spray nozzle of molded plastics but the constructions shown are adapted to be made out of metal or such materials as will perform the service of the mechanical constructions herein shown.

It has been the practice more or less in the past that nozzle attachments have been made of rubber and are secured to the nozzle by the elasticity of the rubber nozzle being pressed on to the faucet end and held thereon by frictional contact of the rubber. The character of rubber is such that one size of aperture in the rubber into which the end of the faucet may be pressed, the elasticity of the rubber allows it to be adapted to be applied to several sizes of the faucet ends simply by the elasticity of the rubber adjusting itself to the faucet nozzle.

I prefer to use some cork inlay bushings for fitting the nozzles to the faucet ends. This bushing is provided with several inside diameters offset from each other, the larger one being on the top to fit the larger diameter and the next narrower diameter farther into the attachment will cause it to be shoved up farther on to the faucet end, and so on to the end that those offset diameters will permit my invention to be applied to the faucet ends of several sizes of faucets, the elasticity of the cork bushing furnishing sufficient friction to perform the service in the absence of rubber. In other words my cork bushing is provided with three or more bores, the larger one on the outside and when the nozzle is pushed on to the faucet end, it is pushed up to a tight fit of the bore which nearest fits that particular faucet end.

An object of my invention is to provide the aforesaid means of attaching my spray nozzle to the ordinary end of the kitchen faucet or the like.

Another object of the invention is to provide the mechanisms in form which may be molded as relates to those parts which form the gate valve, the outside shell of the whole unit and the perforated screen which forms the spray.

Another object of the invention is to form my constructions whereby the assembly of the parts is simplified and that the elasticity of the perforated screen when mounted in place becomes an elastic tension that holds the valve mechanisms in place.

Another object of the invention is to make a neat, compact spray nozzle having, when desired, no protruding ends or handle sticking outside of the outside diameter or lower face of the shell of the unit which might be damaged by contact with dishes being handled in the sink or other extraneous objects which might be handled in and around the location of the nozzle.

Another object of the invention is to form the structures and shapes of my mechanisms which may be manufactured with the least expense.

Reference will be had to the accompanying drawing in which—

Fig. 1 is a perspective view of a faucet with my spray nozzle attached.

Fig. 2 is a perspective view of the shell or outside body of my nozzle.

Fig. 3 is a vertical section through the nozzle on line 3—3 of Fig. 4.

Fig. 4 is a bottom plan of the mechanisms when the bottom perforated screen has been removed and shows the position of the valve mechanisms when the perforations of the plate have been shut off from flowing and the faucet discharge is open for a full single nozzle stream.

Fig. 5 is a similar view to that of Fig. 4 but in the position where a slide valve shuts off the single stream of the nozzle and directs the flow through the perforated screen.

Fig. 6 is a vertical section on line 6—6 of Fig. 5.

Fig. 7 is a perspective view of the perforated plate which is shown as used in Figs. 1 to 6 inclusive.

Fig. 8 is a perspective view of the valve mechanisms as shown in Figs. 1 to 6 inclusive.

Fig. 9 is a modified construction and arrangement of the valve mechanisms shown as a bottom plan.

Fig. 10 is another modified form of the valve mechanism.

Fig. 11 is a vertical section of the modified form on line 11—11 of Fig. 10.

Fig. 12 is a horizontal section through the valve on line 12—12 of Fig. 8.

In the drawing 2 indicates the outside shell body of the nozzle in which there is mounted the cork bushing 3 provided with the three offset diameter apertures 4, 5 and 6, the latter being the smallest diameter through the cork bushing 3 and this diameter corresponds to what is a normal faucet opening discharge.

The shell 2 is provided with an outward horizontal flange 7 from which there extends a downward flange 8. Pressed into this flange 8 there is a perforated plate 9. In the center of this perforated plate 9 there is an open aperture 10 which corresponds in diameter with the aperture 6 of the cork bushing 3.

On the outside of the shell body 2 there is an interior extending flange 11 which extends to the diameter of the opening 6 of the cork bushing 3 which corresponds to the aperture 10 in the plate 9.

Above this interior flange 11 and under the bottom of the cork bushing 3 there is placed a strainer 12 of cloth, wire screen or other suitable material which may be replaced as desired, the purpose of which is to dam off any material which might clog the perforations of the plate 9.

A valve block 13 is shown in perspective in Fig. 8 and in section in Figs. 3 and 6 and 12 and in bottom plans in Figs. 4 and 5.

This valve block 13 is provided with a tubular portion 14 of a depth that extends from the flange 11 down to a close contact with the perforated plate 9. This is shown in Figs. 3 and 4 as being located concentric with the aperture 6 in the cork bushing 3 and the aperture 10 in the perforated plate 9. Thus when this valve block 13 is in the positions as shown in Figs. 3 and 4 there is a clear passageway from the faucet and the perforations in the plate 9 are shut off from current supply by the tubular portion 14 of the block 13.

This block 13 is provided with a valve portion 15 which fits snugly on the top of the perforated plate 9 and is a little less than one-half the depth of the tubular portion 14 of the block 13. Thus when the block 13 is in the positions as shown in the Figs. 5 and 6 the aperture 10 of the perforated plate 9 is closed off from the direct flow from the faucet and since the tubular portion 14 is at one side of the central opening through the cork bushing 3, the water flows down on to the top of a valve portion 15 of the block 13 and is dispensed sidewise and spread over the perforations in the perforated plate 9.

Valve block 13 is provided with a projection 16. Into this projection 16 there is fixed a crank handle 17 which is pivoted in a perforation or hole 18 in the perforated plate 9. Thus the perforated plate 9 becomes a bearing for the crank handle 17 to move the whole block 13 around the hole 18 in the plate 9 and thus alternately move the tubular portion 14 and the valve portion 15 into position over the central aperture 10 of the perforated plate 9. Thus by rocking the crank handle 17 either a spray or a solid stream may be had.

The modified form as shown in Fig. 9 is a bottom plan view of a valve block 19 which is moved transversely instead of rotatively as is indicated in Figs. 3, 4, 5 and 6. This valve block 10 of Fig. 9 is provided with the valve portion 20 and the tubular portion 21 and is supported by extension rods 22 and 23 which are integral with or rigidly attached to the block 19. These extension rods 22 and 23 pass through perforations 24 in the vertical downward flange 8 of the shell 2.

In the manufacture of the modified form of Fig. 9 the extension rod 23 is a separate piece having an end 25 which is inserted in place in the valve block 19 after the latter has been mounted in place above the perforated plate 9. When a perforated plate of the character indicated by 9 is used with the modified form as shown by Fig. 9, the aperture or hole 18, as indicated in Fig. 7, is absent.

In the modified form as shown by Fig. 10 there is provided a valve block 26 having a valve portion 27 and a projection portion 28 along with the tubular portion 29 corresponding to the tubular portion 14 as shown in Figs. 3, 4, 5 and 6.

In the projection 28 there is a vertical pivot pin 30 which extends up through the horizontal flange 7 of the shell 2. On the opposite side of the valve block from the projection 28 there is a projection 31 on the valve block 26 and in this projection 31 there is a vertical pin or stud 32. This stud or pin 32 extends upward through the horizontal flange 7 of the shell 2 which at this location is provided with a curved slot 33 in the form of an arc. The projection 31 has a curved flange on each side of the vertical pin 32 which fits snugly up against the inside of the horizontal flange 7 of the shell 2.

Thus when the tubular portion 29 and the valve portion 27 of the block 26 are moved to give either a full stream or a spray the vertical pin 32 which sticks above the flange 7 is moved through the arc of the slot 33.

In this form of Fig. 10 in which the block 26 is shown in bottom plan the valve portion 27 will contact snugly the perforated plate 9 which is not shown in Fig. 10, nor is this perforated plate 9 shown in Fig. 9. In these modified forms as shown in Figs. 9 and 10, as before stated, the perforation or hole 18 of the perforated plate 9 is wanting.

In the form as indicated by Fig. 10 the pivot pin 30 projects but slightly upward through the horizontal flange 7 of the shell 2, whereas the vertical pin 32 extends above the flange 7 sufficiently to make a handle for contact with the finger which moves the block 26 through the arc of the curved slot 33 in shifting to and from the spray or the single flow of water.

The preferred form of the nozzle is indicated by Figs. 3, 4, 5 and 6. However, the function of the valve blocks 13, 19 and 26 is substantially the same and their fitting into the bottom of the nozzle insofar as opening and closing the perforations in the perforated plate 9 is exactly the same.

What I claim is:

1. In a nozzle of the class described, an enclosing shell, a cork bushing located inside the top portion of said shell and provided with several diameters of bores adapted to be adjusted and mounted upon the discharge nozzle of a faucet by frictional contact, a horizontal flange in the body of the shell at its lower portion extending to a larger diameter than the top portion of the shell, an interior horizontal flange extending under the said cork bushing and provided with an aperture approximating the diameter of the smallest bore of the said cork bushing, a strainer of suitable material mounted on the interior horizontal flange and underneath the cork bushing, an outside circular downward extending flange on said shell, a perforated plate mounted in the bottom of this downward flange thus forming an enclosed space between the aforementioned horizontal flange and the said perforated plate, a central aperture in said perforated plate which aperture approximates the diameter of the smallest bore of the cork bushing; a valve block mounted in between the said horizontal flange and the said perforated plate, said valve block provided with a tubular portion of a depth extending between the said perforated plate and the underside of the said horizontal flange of the said shell and the said valve block having a valve portion on the body of the said block of substantially less thickness than the depth of said tubular portion and of an outline adapted to contact and to cover the aperture in the said perforated plate as and when the said valve portion is placed in position over the said aperture; in combination with means for supporting and moving the said valve block in the said space between the said horizontal flange and the said perforated plate and in sliding movement to cover and uncover the aperture in the said perforated plate, the said valve portion on said valve block contacting closely the inner surface of the said perforated plate.

2. In a nozzle of the class described, an enclosing shell, a cork bushing located inside the top portion of said shell and provided with several diameters of bores adapted to be adjusted and mounted upon the discharge nozzle of a faucet by frictional contact, a horizontal flange in the body of the shell at its lower portion extending to a larger diameter than the top portion of the shell, an interior horizontal flange extending under the said cork bushing and provided with an aperture approximating the diameter of the smallest bore of the said cork bushing, a strainer of suitable material mounted on the interior horizontal flange and underneath the cork bushing, an outside circular downward extending flange on said shell, a perforated plate mounted in the bottom of this downward flange thus forming an enclosed space between the aforementioned horizontal flange and the said perforated plate, a central aperture in said perforated plate which aperture approximates the diameter of the smallest bore of the cork bushing, a valve block mounted in between the said horizontal flange and the said perforated plate, said valve block provided with a tubular portion of a depth extending between the said perforated plate and the underside of the said horizontal flange of the said shell and the said valve block having a valve portion on the body of the said block of substantially less thickness than the depth of the said tubular portion and of an outline adapted to contact and to cover the aperture in the said perforated plate as and when the said valve portion is placed in position over the said aperture; in combination with means for supporting and moving the said valve block in the said space between the said horizontal flange and the said perforated plate and in sliding movement to cover and uncover the central aperture in the said perforated plate, the said valve portion on said valve block contacting closely the inner surface of the said perforated plate, said supporting and moving means of the said valve block being composed of a pivot pin handle fixed in a projection of the said valve block and extending outward through and pivoted on a hole in the said perforated plate.

3. In a nozzle of the class described, an enclosing shell, a cork bushing located inside the top portion of said shell and provided with several diameters of bores adapted to be adjusted and mounted upon the discharge nozzle of a faucet by frictional contact, a horizontal flange in the body of the shell at its lower portion extending to a larger diameter than the top portion of the shell, an interior horizontal flange extending under the said cork bushing and provided with an aperture approximating the diameter of the smallest bore of the said cork bushing, a strainer of suitable material mounted on the interior horizontal flange and underneath the cork bushing, an outside circular downward extending flange on said shell, a perforated plate mounted in the bottom of this downward flange thus forming an enclosed space between the aforementioned horizontal flange and the said perforated plate, a central aperture in said perforated plate which aperture approximates the diameter of the smallest bore of the cork bushing, a valve block mounted in between the said horizontal flange and the said perforated plate, said valve block provided with a tubular portion of a depth extending between the said perforated plate and the underside of the said horizontal flange of the said shell and the said valve block having a valve portion on the body of the said block of substantially less thickness than the depth of the said tubular portion and of an outline adapted to contact and to cover the central aperture in the said perforated plate as and when the said valve portion is placed in position over the said aperture; in combination with means for supporting and moving the said valve block in the said space between the said horizontal flange and the said perforated plate and in sliding movement to cover and uncover the aperture in the said perforated plate, the said valve portion on said valve block contacting closely the inner surface of the said perforated plate, the said means of moving and supporting the said valve block being composed of extension rods on each side of said block which slide and pass through perforations in the said downward flange of the said shell.

4. In a nozzle of the class described, an enclosing shell, a cork bushing located inside the top portion of said shell and provided with several diameters of bores adapted to be adjusted and mounted upon the discharge nozzle of a faucet by frictional contact, a horizontal flange in the body of the shell at its lower portion extending to a larger diameter than the top portion of the shell, an interior horizontal flange extending under the said cork bushing and provided with an aperture approximating the diameter of the smallest bore of the said cork bushing, a strainer of suitable material mounted on the interior horizontal flange and underneath the cork bushing, an outside circular downward extending flange on said shell, a perforated plate mounted in the bottom of this downward flange thus forming an enclosed space between the aforementioned horizontal flange and the said perforated plate, a central aperture in said perforated plate which aperture approximates the diameter of the smallest bore of the cork bushing, a valve block mounted in between the said horizontal flange and the said perforated plate, said valve block provided with a tubular portion of a depth extending between the said perforated plate and the underside of the said horizontal flange of the said shell and the said valve block having a valve portion on the body of the said block of substantially less thickness than the depth of the said tubular portion and of an outline adapted to contact and to cover the aperture in the said perforated plate as and when the said valve portion is placed in position over the said aperture; in combination with means for supporting and moving the said valve block in the said space between the said horizontal flange and the said perforated plate and in sliding movement to cover and uncover the aperture in the said perforated plate, the said valve portion on said valve block contacting closely the inner surface of the said perforated plate, said supporting and moving means for the said block being composed of a pivot pin on the top side of a projection on said block and mounted in a vertical position in the said horizontal flange of the said shell, said valve block having a projection on the side opposite the said pivot pin, a vertical pin extending upwardly from said projection and through a curved slot in said horizontal flange to provide a finger contact for moving the said valve block through an arc to cover and uncover the central aperture of the said perforated plate.

5. In a nozzle of the class described, a tubular shell having a tubular opening adapted to be mounted on a regular faucet by frictional contact, a horizontal flange of larger diameter than the interior of said shell, a circular downwardly projecting flange on said horizontal flange, a perforated plate mounted across the bottom of the said downwardly projecting circular flange thereby forming an enclosed space between the said plate and the said horizontal flange, a valve block mounted between the said plate and the said horizontal flange, said valve block having a tubular portion extending from the underside of the said horizontal flange down to and in contact with the inside of the said perforated plate, said valve block having a valve portion connected aside from and to the said tubular portion and of substantial less thickness than the depth of the said tubular portion and mounted to slide over the inside of the said perforated plate and of an outside area slightly larger than a central aperture in the said perforated plate, a central aperture in said perforated plate slightly smaller than the coverage area of the said valve portion of the said valve block; in combination with means for moving the said valve block to and from position whereby the said tubular portion and the said valve portion may alternately uncover and cover the said central aperture of the said perforated plate.

6. In a nozzle of the class described, a tubular shaped shell having a diameter at the base larger than at the top, an elastic bushing in the top portion and an open space in the lower end of the larger diameter of said shell, a perforated plate fixed in the lower end of the said open space and permanently fixed therein thereby forming a circular disk shaped chamber, a movable valve sliding on the top of the said perforated plate, said valve having a tubular portion extending between the said perforated plate and the flange which forms the top of the said chamber, the depth of said valve being substantially less than the depth of the tubular portion and contacting only the inside of said perforated plate; in combination with means extending outwardly from the said chamber for moving the said valve and its tubular portion over the surface of the said perforated plate.

MAX LEONA ANDERSON.